(12) United States Patent
Mutou et al.

(10) Patent No.: US 6,476,303 B1
(45) Date of Patent: Nov. 5, 2002

(54) MUSIC NOTATION IMPLEMENT AND MUSIC

(75) Inventors: Kanpei Mutou, Tokyo (JP); Ritsuko Mutou, Tokyo (JP); Seburou Mutou, Tokyo (JP)

(73) Assignee: Tokyo Yusyo Co., Ltd., Tokyo (JP)

( * ) Notice: Subject to any disclaimer, the term of this patent is extended or adjusted under 35 U.S.C. 154(b) by 0 days.

(21) Appl. No.: 09/763,379

(22) PCT Filed: Aug. 20, 1999

(86) PCT No.: PCT/JP99/04487

§ 371 (c)(1),
(2), (4) Date: Feb. 21, 2001

(87) PCT Pub. No.: WO00/11635

PCT Pub. Date: Mar. 2, 2000

(30) Foreign Application Priority Data

Aug. 21, 1998 (JP) ............................................ 10-250345

(51) Int. Cl.[7] ............................................. G09B 15/02
(52) U.S. Cl. ..................................... 84/483.2; 84/483.1
(58) Field of Search ............................... 84/481.2, 483.1

(56) References Cited

U.S. PATENT DOCUMENTS 1,539,308 A  * 5/1925 Faunt ........................ 84/483.2
5,574,238 A  * 11/1996 Mencher ..................... 84/483.2
5,998,721 A  * 12/1999 Lepinski ..................... 84/483.2

FOREIGN PATENT DOCUMENTS

GB         2065357       * 6/1981

* cited by examiner

Primary Examiner—Shih-Yung Hsieh
(74) Attorney, Agent, or Firm—Chapman and Cutler

(57) ABSTRACT

The objects of the present invention are to provide a music sheet on which all the notes can be presented without using sharps or flats and to make writing and reading music easier. A music sheet is formed by providing base lines (3) at a certain distance, a center line (4) positioned between adjoining base lines, and two supplementary lines (5) which are aligned in such a way that the supplementary lines equally divide a space between the base line and the center line into three and preferably presented in such manner that they are distinguishable from the base lines (3) and the center line (4).

With the above constitution, all the tones within an octave can be presented on a musical score without using sharps or flats, and writing music is easy because of the supplementary lines provided beforehand.

5 Claims, 4 Drawing Sheets

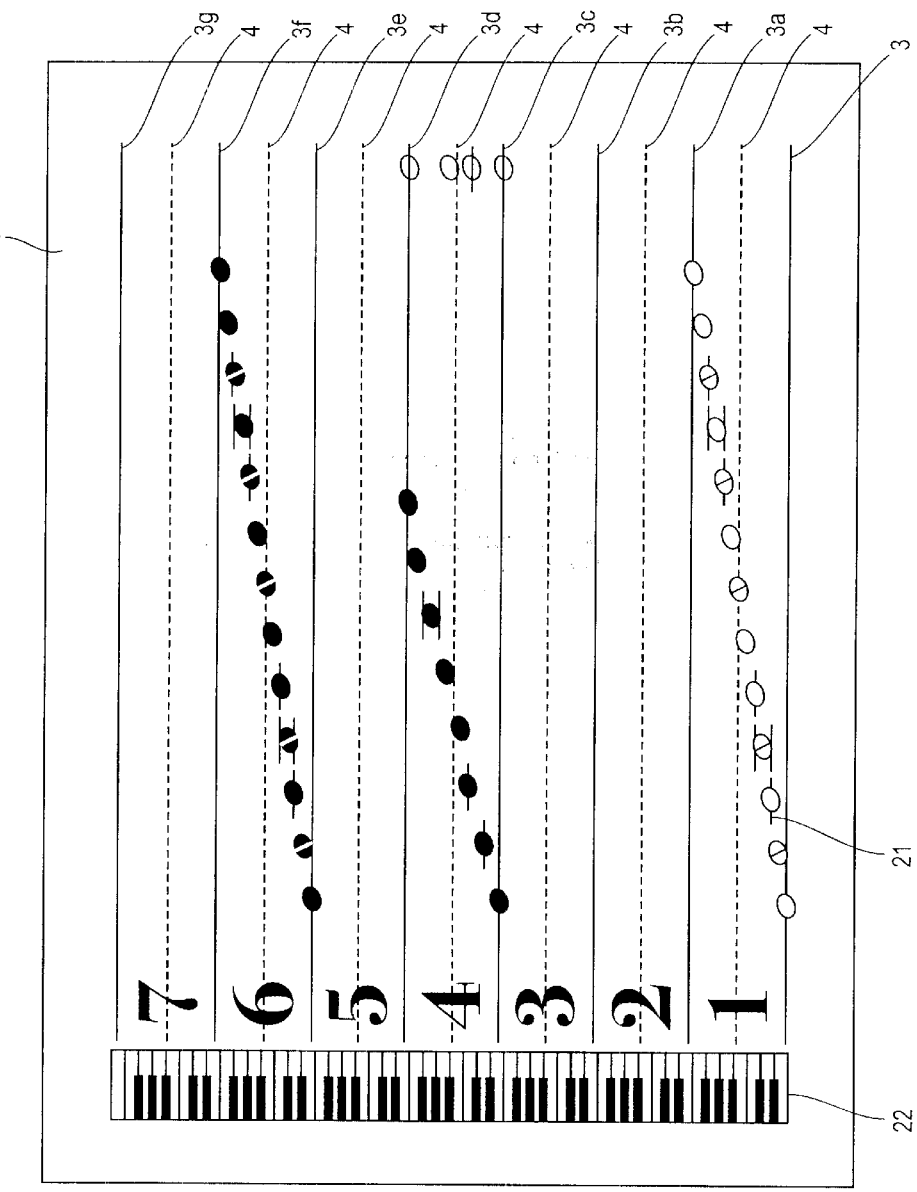

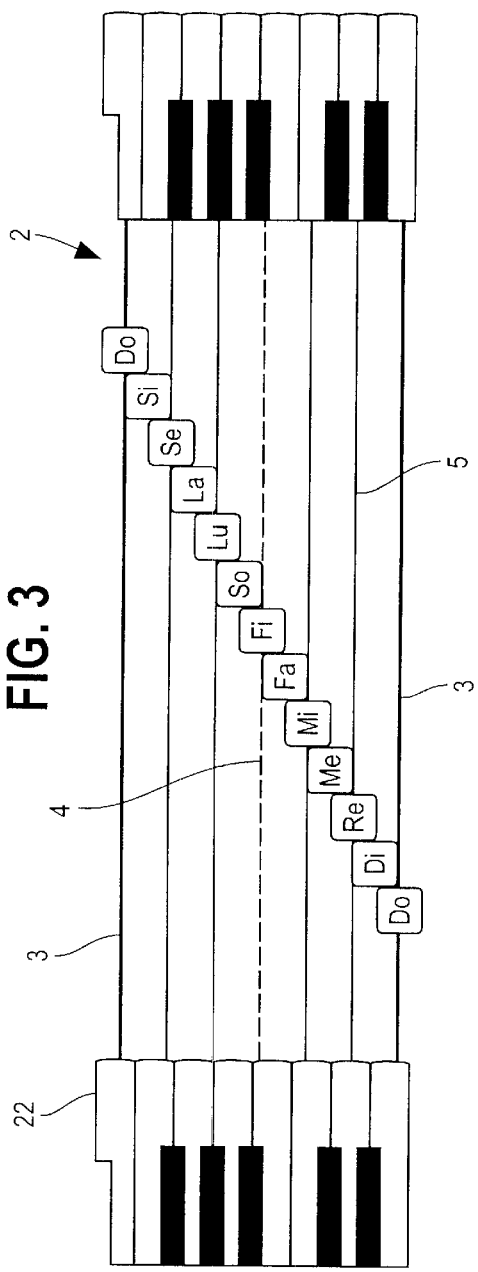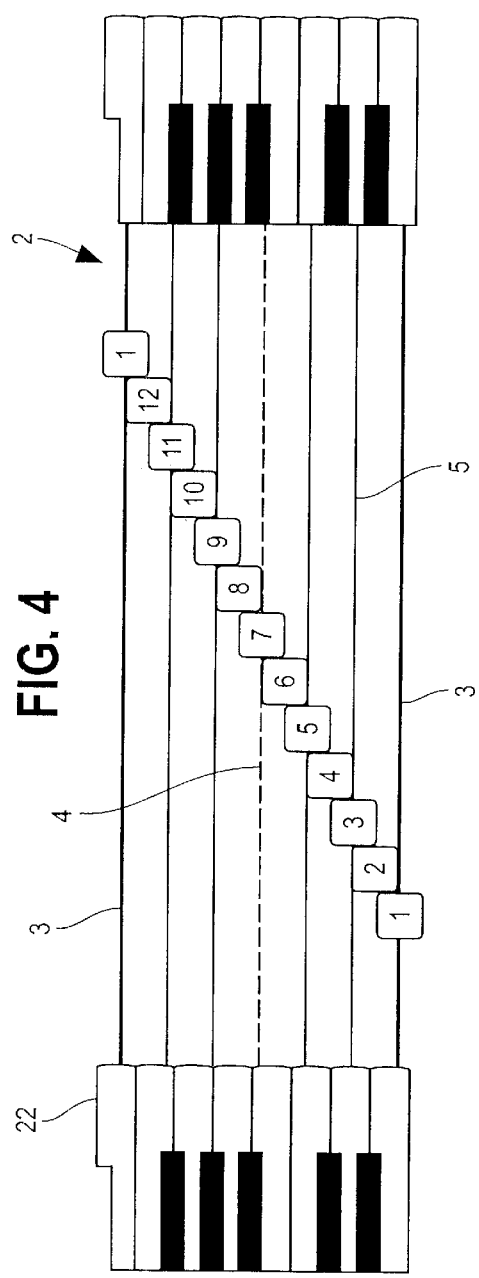

MUSIC NOTATION IMPLEMENT AND MUSIC

This application is a U.S. national phase application of International Application PCT/JP 99/04487, having an International filing date of Aug. 20, 1999 and a priority date of Aug. 21, 1998.

BACKGROUND OF THE INVENTION

1. Field of the Invention

The present invention relates to a novel music notation implement, which substitutes a conventional music paper, and also relates to a music.

2. Description of Related Art

Conventionally, a musical composition has been represented on a music paper with use of staves. On this conventional music paper, a note on the first line represents the tone E and a note on the fifth line represents the tone F in conformity with a treble clef. Therefore, it is impossible to tangibly show ranging octaves in a musical scale on such conventional music papers. In addition, since such notes that do not fit in the conventional staves are presented by using auxiliary lines (upper auxiliary lines or lower auxiliary lines), it requires skill to read music score represented on such conventional music papers.

Moreover, though all notes of the musical scale in C major can be represented at certain positions on a conventional paper, musical scales in other keys cannot be presented thereon without using sharps or flats. Besides, musical intervals do not always agree with the positional differences on the conventional music paper. For example, the musical interval between the tone E and the tone G, which are respectively presented on the first line and the second line, is one and a half tones, while the musical interval between the tone G and the tone B, which is presented on the third line, is two tones.

As a result, it is extremely difficult to know the difference in sounds of chords by seeing notes presented on the conventional music.

Furthermore, since a chromatic scale is presented by the use of sharps or flats, musical scales are divided into either of the sharp system or the flat system. Accordingly, although tones in B major are the same with those in C-flat major, they are represented in different manners by using sharps or flats. The same can be said to the tones in C-sharp major against the tones in D-flat major as well as the tones in F-sharp major against the tones in G-flat major. This is very confusing and often gives a learner such an illusion that a scale in B major and that in C-flat major are composed of different tones.

To solve the above-mentioned problems of the conventional music paper, the applicant has proposed such a music that has upper and lower base lines, a middle line aligned between the base lines, and auxiliary lines which are drawn between the base line and middle line in case of necessity and equally divides a space between the base line and the middle line into three, and wherein a sequence of tones are represented as notes placed on the lines or in intermediate spaces between the lines (Japanese Utility Model Publication No. 5-44152).

However, the proposed music involves the following problems.

First of all, since the auxiliary lines are individually drawn at the time when corresponding notes are written down on the music, it is difficult to draw such auxiliary lines at an accurate level and the resulting music tends to be hard to read.

Secondly, in a case where the music is written for a keyboard instrument, it is difficult to know whether a note indicates a black key or not, since no sharp or flat is used in this music.

In the third place, since notes ranging over several octaves are presented in the same manner on this music, it is difficult to plainly show what level of pitch a certain musical scale represents with use of the conventional treble clef and bass clef.

SUMMARY OF THE INVENTION

Accordingly, the present invention provides a music notation implement, which comprises a plurality of base lines aligned parallel to one another at a preset distance, a middle line positioned in the center between every adjoining two base lines and parallel to the base lines; and two auxiliary lines aligned between one of the base lines and the middle line, which auxiliary lines equally trisecting a space between the base line and the middle line and being presented in such manner that the auxiliary lines are distinguishable from the base lines and the middle line; and wherein a sequence of chromatic tones are represented as notes placed on the lines or in intermediate spaces between the adjoining lines, and a series of numbers or letters, or an illustration of a keyboard, which respectively indicates a corresponding level of musical scale is shown between the adjoining base lines.

This music notation implement may be formed as a sheet music when the above-mentioned lines are drawn on a sheet such as a piece of paper, or may be formed as a program that shows such musical score on a display of personal computer or the like.

Such series of numbers or letters that indicate a level of musical scale can be 1, 2, 3, . . . , or A, B, C, . . . , corresponding to each tone interval respectively. It is also possible to mark the tone interval according to treble clef by using the number 0, and then to indicate higher tone intervals by the use of numbers 1, 2, . . . and lower tone intervals by the use of numbers −1, −2, . . . in this order.

With use of the above-described constitution, even a musical composition which ranges over several octaves can be presented while clearly showing its musical intervals.

The middle line is preferably presented in such manner that the middle line is distinguishable from the base lines, and the auxiliary lines are preferably presented in a color, which is not visible on a photocopy when photocopied by an electronic copying machine.

The invention provides a music notation, in which a musical note corresponding to a black key of a keyboard is marked by a black key indicating symbol. As examples of such black key indicating symbol, mention may be made to a white dot in the center of a black note head and a black dot in the center of an outlined note head (such as a whole note and a half note), in addition to a slash shown in the following preferred embodiment. The invention also may provide a music, in which a distinguishing symbol representing a black key is shown at level positions of the music corresponding to black keys on a keyboard. As examples of such distinguishing symbol, mention may be made to an illustration of a keyboard corresponding to the musical score and marks such as asterisks which are shown on such levels of the musical score that correspond to black keys on a keyboard instrument.

The inventions also may be applied to a conventional music paper. The tones within an octave can be presented with use of two base lines of the present invention. However, it is preferable to use three or more base lines in a practical case. When only two base lines are used in the present invention, those base lines and a middle line can be presented in the same manner. On the other hand, when three or more base lines are used, it is necessary to present the middle lines in such a manner that the middle lines are distinguishable from the base lines. In order to accomplish this object, the middle lines may be distinguished by using colors different from the color of the base lines, or by representing the middle lines as dotted lines or chain lines. It is also possible to distinguish the middle lines from the base lines by putting a mark such as a black circle on the end of the middle lines.

As a color which is not visible when photocopied by an electronic copying machine, mention may be made of waterish blue and extremely light gray.

Incidentally, not only a musical note-notational portion presented on a sheet of paper but also that presented on a synthetic resin sheet, or some other flexible material are within the scope of the present invention.

According to the present invention, two auxiliary lines are provided between one of the base line and the middle line to equally divide a space between the base line and the middle line into three, so that a sequence of chromatic tones are represented as notes placed on the lines or in intermediate spaces between the lines. This means that notes within an octave are presented between two adjoining base lines. Therefore, according to the present invention, it is possible to tangibly show ranging octaves in a continued scale.

As a result, every pair of adjoining notes are presented on the music notation implement according to the present invention with a half tone difference from each other and thus, the difference in the level between two notes on this music notation implement agrees with the musical interval of such two notes. Consequently, chords are easier to understand. Moreover, because the tones of a musical interval heard by one's ear and the difference between notes on this three-line score completely agree with each other in the movement of tone, it is easy to acquire a good ear for music using this scor, and even a perfect ear for music can be easily acquired. Furthermore, all the notes which have been presented on a conventional sheet music with the use of sharps or flats can be presented on the music notation implement according to the present-invention without using sharps and flats. Accordingly, an unskilled person who does not understand the music scores presented on a conventional sheet music can read a key to be played like reading a tabbed score for guitars and thus can play the piano easily.

In addition, since the auxiliary lines are provided beforehand, it is no longer necessary to determine a position for an auxiliary line at the time when the individual notes are written down on the music notation implement, thereby making it easy to accurately position the individual notes. Because the auxiliary lines according to the present invention are presented in a color, which is not visible on a copy when photocopied by an electronic copying machine, a photocopied musical score written down by tracing the auxiliary lines provided beforehand does not show the auxiliary lines where they are not needed.

Using the sheet music according to the present invention, it is easy to recognize notes corresponding to black keys by symbols indicating the black keys shown as a diagonal lines across the note heads, or the like.

BRIEF DESCRIPTION OF DRAWINGS

FIG. 2 is an illustration showing a photocopied form of an embodiment of the present invention.

FIG. 3 is an illustration showing an example of use of the present invention.

FIG. 4 is an illustration showing another example of use of the present invention.

DESCRIPTION OF THE PREFERRED EMBODIMENT

Preferred embodiments of the present invention will be described hereinafter with reference to the attached drawings.

Figure 1:
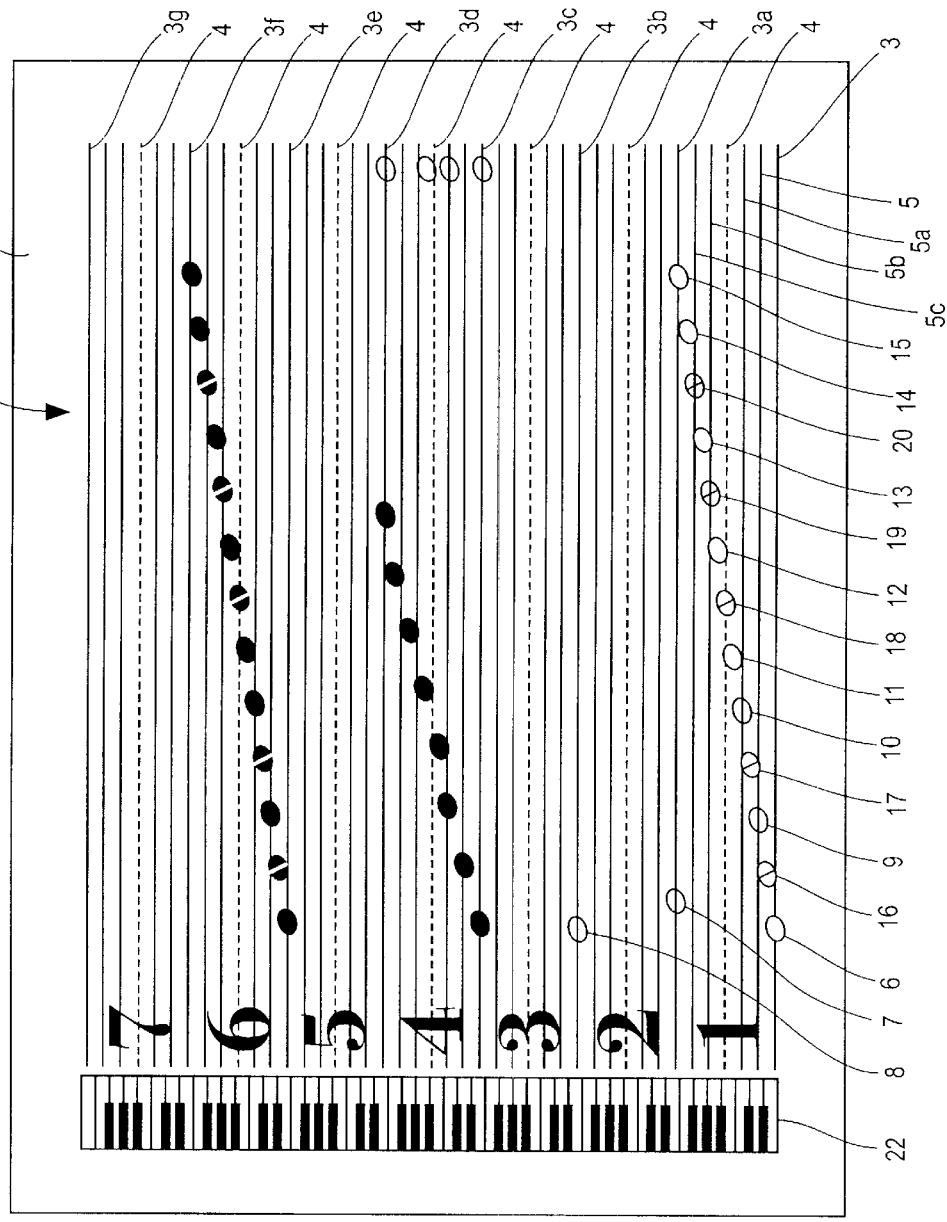
FIG. 1 is an illustration showing an embodiment of the present invention.

A sheet music according to the present invention is shown on FIG. 1. On a paper sheet 1, there is a note-notational portion 2. This note-notational portion 2 includes eight parallel base lines 3, 3a, 3b . . . 3g, which are aligned at a certain distance and shown as solid lines; the middle lines 4 provided as center lines between every two adjoining base lines and aligned parallel to the base lines, shown as chain lines; and auxiliary lines 5, 5a, 5b, 5c in this order from the bottom, aligned between the base lines and the middle line and equally dividing the space between the base line and the middle line into three. The auxiliary lines are represented in waterish blue color, which can not be copied by an electronic copying machine.

The notes are presented with a half tone difference on the above base lines, middle lines and auxiliary lines, and in the intermediate space between the lines. Accordingly, the tones within one octave are represented between the base lines 3 and 3a.

Therefore, on the sheet music of this embodiment, a note which represents the tone C is presented on each base line of the note-notational portion 2. This means that the note 6 on the first base line 3, the note 7 on the second base line 3a and the note 8 on the third base line 3b represent the tone C an octave apart, respectively.

To be more concrete, the tone C-sharp 16 is shown in a space between the base line 3 and the first auxiliary line 5, and the tone D is presented on the first auxiliary line 5. In this connection, the musical interval between the base line 3 and the first auxiliary line 5 is one tone degree and the intervals between the other adjoining two lines are also one tone degree. Accordingly, notes 9–15 in FIG. 1 respectively represent the tones D, E, F. G, A and B, and notes 16–20 respectively represent the tones C sharp, D sharp, F sharp, 6 sharp and A sharp.

In this connection, when a note is to be presented on, above or below an auxiliary line, the auxiliary line should be traced to the extent of such note head as shown in FIG. 2, such that the corresponding part of the auxiliary line can be photocopied. When photocopied, the traced portion of the auxiliary line is presented as a short auxiliary line 21.

On the left side of the above note-notational portion, numbers "1", "2", "3", "4", "5", "6", and "7" are shown between the base lines and they respectively indicate a level of tones. While the musical scale corresponding to the number 4 includes tones according to the treble clef, the scale corresponding to the number 3 includes tones according to the bass clef. Therefore, the numbers 5, 6 and 7 correspond to the high-pitched tones and the numbers 2 and 1 correspond to the low-pitched tones.

The above-mentioned notes 16–20, which represent tones corresponding to the black keys on the keyboard, are marked with a slash so that to enable a person to recognize at a glance that a black key is to be played.

Number 22 indicates an illustration of a piano keyboard and every key of the keyboard corresponds to one of the positions on the sheet music. Therefore, a player can easily learn which key of the piano corresponds to a certain note on the sheet music.

With reference to FIG. 3 and FIG. 4, effects of the sheet music and the musical score according to the present invention will be explained below.

A scale is composed of twelve half tones. When a conventional sheet music with five lines is used, 7 tones corresponding to white keys of the piano are called as "Do, Re, Mi, Fa, So, La, Si" and presented thereon without using sharps or flats. However, other tones are presented with the use of a sharp or a flat such as "Do-sharp" or "Re-flat".

According to the present invention, all tones can be presented on a sheet music without using sharps or flats. Therefore, by giving a new name to tones conventionally called with a sharp or flat, all tones can be called without using a sharp or flat (for example, they can be called "Do, Di, Re, Me, Mi, Fa, Fi, So, Lu, La, Se, Se" as shown in FIG. 3).

In FIG. 4, tones within one octave are numbered starting from 1 to 12. In this example, number "1" is assigned to "Do", "3" to "Re", "5" to "Mi" and "6" to "Fa". The tone, which has been conventionally called in two ways as "Do-sharp" or "Re-flat" is assigned an unified number of "2". Other tones corresponding to black keys are also assigned-unified names as "4", "7", "9" and "11". Consequently, the key having the above tone "2" as a keynote, which has been called as "C-sharp major" with use of sharps or as "B-flat major" with use of flats, can be given a unified name as "2 major".

Figure 5:
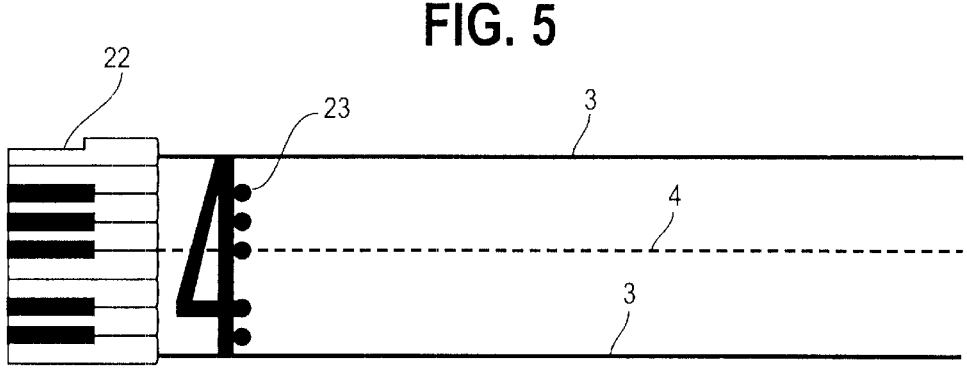
FIG. 5 is an illustration showing a musical score, which is provided with black key indicating symbols.
Figure 6:
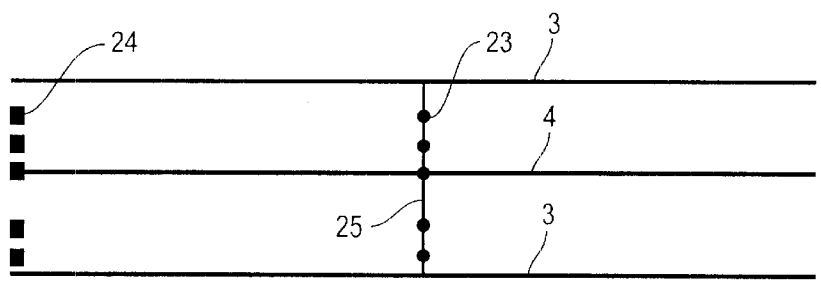
FIG. 6 is an illustration showing another example of the black indicating symbols.
Figure 7:
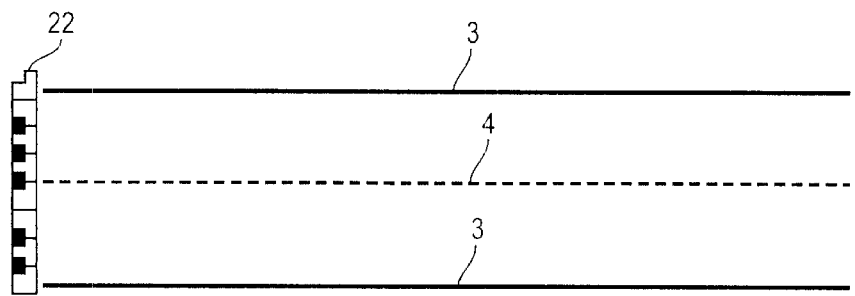
FIG. 7 is an illustration showing still another example of the black indicating symbols.

FIGS. 5–7 show the examples of the distinguishing symbols for black keys.

In FIG. 5, an illustration of keyboard 22 and black circles 23 as distinguishing symbols are shown on the left side of the music sheet and thus a person is able to recognize at a glance that a black key should be played when a note is at a level corresponding to a black key of the illustration 22, or a black circle 23.

In FIG. 6, black squares 24 are provided on the left side of the music sheet and black circles 23 are provided on a bar line 25. In this example, it is easier to know when a black key should be played-because the black key indication symbols are shown near the corresponding notes.

FIG. 7 shows a simplified illustration of keyboard 22 as the distinguishing symbol for black keys.

APPLICABILITY

By notation of the music as described above, tones having the same name are placed on levels, which are the same in relation to the base lines, middle lines and auxiliary lines, thereby making a cycle of an octave. As a result, the musical score according to the present invention is easily and swiftly read. In addition, a changing in key can be easily made by relatively moving the notes as a whole either upward or downward on the note-notational portion.

Moreover, since all the tones within an octave can be presented on a musical score as individual notes without being accompanied by a sharp or a flat, the resulting score is a simple one. Therefore, it is easier to put such score into Braille and thus, reading music becomes easier for a visually handicapped person.

In this connection, if auxiliary lines are presented in a color, which is not visible on a photocopy made by an electronic copying machine, and a musical score is photocopied when finished, the thus-obtained musical score is simple enough to be easily read, because there are no auxiliary lines where they are not necessary.

Furthermore, since it is possible to provide additional base lines below the first base line 3 or above the third base line 3, if necessary, even a musical piece with a wide range can be presented thereon while showing constituting tones in a cycle of an octave.

In this connection, if such numbers that indicate a level of tones are shown on the left side of the score, pitches of notes can be easily and correctly understood even with respect to a musical piece with a wide range.

Since a space between two base lines are equally divided into six to present musical notes, musical intervals always agree with the positional differences between the notes on a musical sheet, thereby making it easier to understand difference in the sound of chord by seeing the score. In addition, all the tones can be presented on a sheet music without using sharps or flats.

In this case, if the note heads, which represent the tones corresponding to black keys are marked with a slash or the like, a person is able to recognize at a glance that a black key should be played on a keyboard instrument.

What is claimed is:

1. A music notation implement comprising:
    a plurality of base lines aligned parallel to one another at a preset distance;
    a middle line positioned in the center of every adjoining two of said base lines, said middle line being parallel to said base lines, and said middle line defining a space between said middle line and each of said base lines; and
    two auxiliary lines aligned between one of said base lines and said middle line, equally trisecting the space between said base line and said middle line;
    wherein said auxiliary lines are presented in such manner that said auxiliary lines are distinguishable from said base lines and said middle line; said base lines are presented in such manner that said base lines are distinguishable from said auxiliary lines and said middle line; said middle line is presented in such manner that said middle line is distinguishable from said base lines and said auxiliary line;
    a sequence of chromatic tones are represented as notes placed on one of said lines or in intermediate spaces between said adjoining lines,
    said notes placed on said base lines represent the same tone of different octaves; and
    a series of numbers or letters, or an illustration of a keyboard, which respectively indicates a corresponding level of musical scale are shown between each adjoining pair of base lines.

2. A music notation implement according to claim 1, wherein said auxiliary lines are presented in a color that is not visible when photocopied by an electronic copying machine.

3. A music notation implement according to claim 1, wherein a musical note corresponding to a black key of a keyboard is marked by using a diagonal line.

4. A music notation implement according to claim 1, wherein a distinguishing symbol representing a black key is shown at such levels of musical score that correspond to black keys of a keyboard instrument.

5. A music notation implement according to claim 1, comprising at least four of said base lines and indicating chromatic tones of at least three octaves.

* * * * *